May 28, 1968 SEIICHI YAZAKI 3,385,297
UNITARY NURSING NIPPLE HAVING A FLOW CONTROL DIAPHRAGM
Filed Dec. 17, 1965
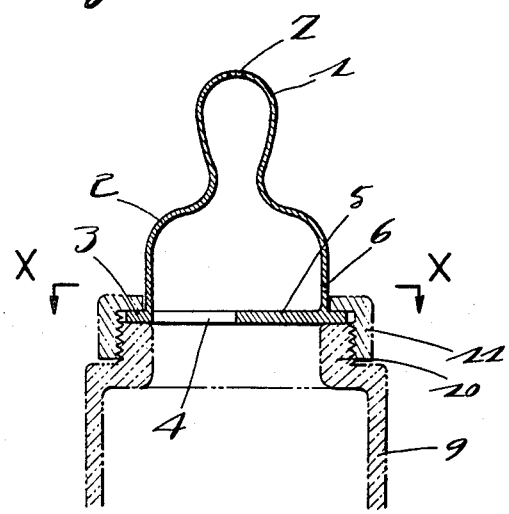
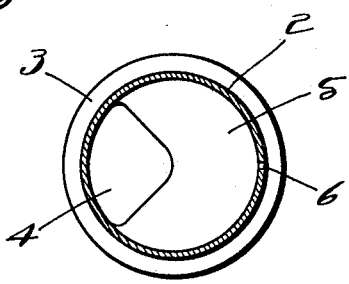
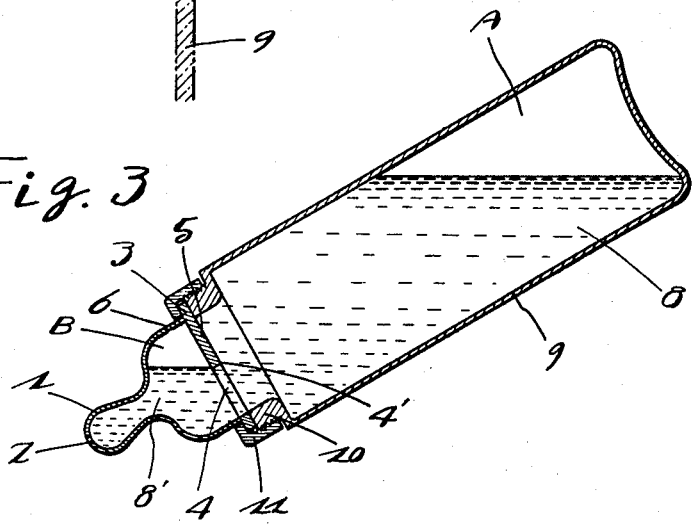
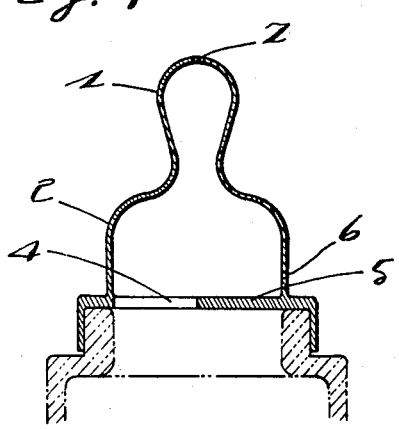
Seiichi Yazaki
INVENTOR
BY Hall & Houghton
ATTORNEY

3,385,297
UNITARY NURSING NIPPLE HAVING A FLOW CONTROL DIAPHRAGM
Seiichi Yazaki, Nippon-Jutakukudan A 24–2, 1–4, 2-chome, Korigaoka, Herakata, Japan
Filed Dec. 17, 1965, Ser. No. 514,474
2 Claims. (Cl. 128—252)

ABSTRACT OF THE DISCLOSURE

A unitary elastic nursing bottle mouthpiece provided with an elastic partition or diaphragm integral therewith and extending across the transverse cross-section of the breast portion and having a flow space therethrough covering about one quadrant of said cross-section. The breast portion has an air vent in its outer wall opposite the flow space. An air space is thus provided in the breast portion in fixed location relative to the flow space, in addition to the air space in the bottle itself, and hydrostatic pressure maintains an equilibrium between them during feed from the bottle. Excessive feed of milk when the bottle is nearly full, and deficient feed when it is nearly empty, are thus avoided.

---

The present invention relates to a nursing device, and more particularly a mouthpiece of nursing bottle which gets milk to run out in quite a natural stream as much as the baby wants while he sucks it, to stop running out at the very instant he stops sucking and never to spout out accidentally when he bites the nipple or does some other kinds of actions, so long as it is capped on the usual well-known type of nursing bottle.

A mouthpiece of usual type capped on the nursing bottle of usual type has a great disadvantage that it gets milk to run out in an unnaturally excessive stream when it is sufficiently full of milk, however to run out in an unnaturally deficient stream when it is not sufficiently full of milk; in the former case the baby is often suffocated, while in the latter case he often cries out for what he wants as the result that he sucks in vain only to flatten the nipple. The deficient stream of milk is due to the fact that the nursing bottle has pressure reduced in a blank space widened in response to running-out of milk. The only thing that can be done to restore the natural stream of milk is to deprive the suckling of the milk bottle, let air go into the bottle by way of the sucking point on the top of nipple while the bottle is kept in the standing position, and then return the bottle to the mouth of suckling in the sucking position of bottle. And a real nuisance is that the above handling of bottle requires more or less repetition during sucking.

There are already some attempts made to overcome the above-described disadvantage, either by providing a small hole at the foot of mouthpiece or by providing a special mechanism in the bottle. In either case, air is introduced into the nursing bottle to keep milk in natural sucking stream, but with other disadvantages occurring instead; the one that has a small hole at the foot of mouthpiece inevitably permits milk to spout out when the nipple is pressed in the baby's sucking action, and also causes the milk to foam undesirably; and the other, that has a special mechanism in the bottle, is not sufficiently simple and easy to handle.

A major object of the invention is to provide a mouthpiece of nursing bottle which permits milk always to run out in quite a natural stream as much as the baby sucks, irrespective of the milk level in the bottle and of the baby's suction action.

Another object of the invention is to provide a mouthpiece of nursing bottle which is capped on a nursing bottle of usual type in a simple and easy manner, while it permits milk always to run out in qute a natural stream as much as the baby sucks.

In the accompanyng drawings; FIG. 1 is a vertically sectional front view of a mouthpiece for nursing bottle showing an embodiment of the invention, FIG. 2 is the plan view taken along X—X line of FIG. 1, FIG. 3 is a vertical section of nursing bottle in the sucking condition capped with the mouthpiece in accordance with the invention, and FIG. 4 is a vertically sectional front view of a mouthpiece for nursing bottle showing another embodiment of the invention.

The mouthpiece for nursing bottle in accordance with the invention is made of some elastic material, such as rubber. In FIG. 1, a mouthpiece comprises a nipple portion 1 made a breast portion 2 and is formed integral with a partition 5 inside the lower end and with an annular flange 3 outside the lower end. A hole 4 is opened on the partition 3 in one side, while a pore or air vent 6 is opened above the partition 3 in the other side. As is shown in FIG. 2, the partition or diaphragm 5 closes substantially three of the four quadrants, i.e. a major portion, of the cross-section of the breast portion 2 wherein it is located, leaving an open flow space 4 substantially coextensive with the remaining quadrant thereof, so that it has a substantial open area and extends to the wall of the breast portion from about the central axis thereof. A sucking point 7 is opened at the top of nipple 1.

The mouthpiece 2 in accordance with the invention is secured to the bottle by suitable means shown in FIGS. 1 and 3 as a capping rim 11 threaded on the mouth 10 of nursing bottle 9 where milk 8 is filled. In the normal sucking position with the pore 6 upside as shown in FIG. 3, there will be produced air chambers A and B inside the bottle 9 and inside the mouthpiece 2, respectively. The pressure balance is then maintained between the bottle and the mouthpiece as follows:

Pressure of milk 8 inside bottle 9+pressure of air A inside bottle 9=pressure of milk 8' inside mouthpiece 2+pressure of air B inside mouthpiece 2.

While through the pore, the pressure of air B is always equal to atmosphere pressure.

When the milk 8' is sucked out more or less, the above equilibrium is broken; in the mouthpiece 2 the milk level goes down the upper margin 4' of hole 4 and the corresponding amount of air comes in by way of the pore 6, which air then goes in and passing through the milk 8 in the form of bubble, and to join with the air A in the bottle 9 while the corresponding amount of milk comes out of the bottle 9 into the mouthpiece 2 by way of the hole 4, until the milk level goes up to the upper margin 4' of hole 4 to restore the equilibrium of pressure as shown in FIG. 3.

In other words, the mouthpiece of nursing bottle in accordance with the invention lets milk run out in quite a natural stream as long as the baby sucks, and lets milk stop running out at the very moment he stops sucking because in the mouthpiece 2 the milk level is always at the upper margin 4' of hole 4 to balance the pressure between the bottle 9 and the mouthpiece 2 unless while milk is being sucked out of the latter.

Suppose the baby bites the nipple 1 while he sucks, any part of milk 8' will not spout out, but some of air B will do so through the pore 6 provided in the mouthpiece according to the invention.

The mouthpiece in accordance with the invention may seen to be troublesome to clean inside owing to the existence of partition 5. On the contrary, it is actually quite easy and satisfactory to clean inside if only in water opposite portions are rubbed inside each other while they are held between a pair of fingers outside. As will be evident from FIG. 2, the making of the partition 5 integral with the mouthpiece 2 insures that the vent 6 always stays diametrically opposite to the open flow space 4. The flow space 4 extending over about one quadrant of the cross-section is especially useful. It allows air passing from space B to space A to pass under the partition in large bubbles, thus minimizing foaming as compared to the known types of baby bottles above mentioned in which the small hole at the foot of the mouthpiece is immersed in the milk and causes undesirable foaming. It also facilitates removal of the mold during the integral manufacture, as well as providing free ingress and egress of washing and rinsing fluids during cleaning and sterilizing of the mouthpiece.

In the form of FIG. 4, in lieu of the use of the cap ring 11, the annular flange 3 integral with the mouthpiece 2 is formed to extend below the partition 4 to cap the mouthpiece 2 directly on the bottle 9.

It will thus be seen that the mouthpiece of nursing bottle in accordance with the invention gets milk to run out in quite a natural stream as much as the baby wants all through his sucking, to stop running out at the very instant he stops sucking, and never to spout out accidentally when he bites the nipple, while the mouthpiece is applied to any nursing bottle of usual type in quite an easy and simple manner.

What I claim:

1. A unitary elastic mouthpiece for a nursing bottle, comprising, in combination:
   (a) a breast portion (2) of elastic material,
   (b) a nipple portion (1) of elastic material integral with said breast portion and having feed opening means (7) therein, and
   (c) a diaphragm (5) of elastic material integral with and extending transversely of the cross-section of said breast portion (2),
   (d) said diaphragm (5) closing a major portion of said cross-section but leaving a flow space (4) of substantial area therepast extending about from the central axis to the wall of said breast portion (2) and
   (e) said breast portion (2) having in its wall a vent opening (6) located inwardly of and proximate to said diaphragm (5) and permanently positioned about diametrically opposite to said flow space.

2. A mouthpiece as claimed in claim 1, wherein with reference to said central axis:
   (f) said diaphragm (5) extends over approximately three quadrants of said cross-section, and
   (g) said flow space (4) extends over about one quadrant thereof.

References Cited

UNITED STATES PATENTS

| 956,741 | 5/1910 | Smith | 128—252 |
| 982,776 | 1/1911 | Decker | 128—252 |
| 2,803,250 | 8/1957 | Barr | 128—252 |
| 2,812,092 | 11/1957 | Witz | 215—11 |

FOREIGN PATENTS

| 455,605 | 5/1913 | France. |
| 1,018,792 | 10/1952 | France. |

RICHARD A. GAUDET, *Primary Examiner.*

R. L. FRINKS, *Examiner.*